United States Patent
Sim

(10) Patent No.: US 9,294,798 B2
(45) Date of Patent: Mar. 22, 2016

(54) SYSTEM AND METHOD FOR CONTROLLING A MIRROR LINK OF A MULTIMEDIA SYSTEM AND PORTABLE TERMINAL

(71) Applicant: Hyundai Motor Company, Seoul (KR)

(72) Inventor: Hyun Chul Sim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/474,732

(22) Filed: Sep. 2, 2014

(65) Prior Publication Data

US 2015/0181274 A1 Jun. 25, 2015

(30) Foreign Application Priority Data

Dec. 24, 2013 (KR) .......................... 10-2013-0162426

(51) Int. Cl.
| | |
|---|---|
| *H04N 7/18* | (2006.01) |
| *H04N 21/41* | (2011.01) |
| *H04N 21/414* | (2011.01) |
| *H04N 21/643* | (2011.01) |
| *H04N 21/478* | (2011.01) |

(Continued)

(52) U.S. Cl.
CPC .............. *H04N 21/4122* (2013.01); *H04N 7/18* (2013.01); *H04N 21/41407* (2013.01); *H04N 21/41422* (2013.01); *H04N 21/43632* (2013.01); *H04N 21/43637* (2013.01); *H04N 21/478* (2013.01); *H04N 21/643* (2013.01); *H04N 21/8126* (2013.01)

(58) Field of Classification Search
CPC ... H04N 21/4122; H04N 7/18; H04N 21/643; H04N 21/41407; H04N 21/41422; H04N 21/43637; H04N 21/478; H04N 21/8126; H04N 21/43632

USPC ........ 725/38, 75, 83; 715/717, 718, 746, 804, 715/864; 701/33.2
See application file for complete search history.

(56) References Cited

U.S. PATENT DOCUMENTS

| 8,892,691 B2 * | 11/2014 | Pantos et al. ................. 709/219 |
|---|---|---|
| 2012/0051560 A1 * | 3/2012 | Sanders ........................ 381/105 |

(Continued)

FOREIGN PATENT DOCUMENTS

| KR | 1020050068587 | 7/2005 |
|---|---|---|
| KR | 10-1017866 B1 | 3/2011 |

(Continued)

OTHER PUBLICATIONS

Lucas Mearian, Apple's CarPlay vs. MirrorLink: Is there a need for both?, Mar. 4, 2014, Computerworld.*

(Continued)

*Primary Examiner* — Hoang-Vu A Nguyen-Ba
(74) *Attorney, Agent, or Firm* — Mintz Levin Cohn Ferris Glovsky and Popeo, P.C.; Peter F. Corless

(57) ABSTRACT

A system and method of controlling a mirror link are provided. The method includes connecting, by a controller, a multimedia system mounted within a vehicle to a portable terminal and executing an application to perform the mirror link. In addition, a menu is output to independently control an output image of the multimedia system and the portable terminal to the vehicle. The controller is also configured to independently control the output image of the multimedia system and the portable terminal based on a user selection.

17 Claims, 2 Drawing Sheets

(51) Int. Cl.
*H04N 21/81* (2011.01)
*H04N 21/4363* (2011.01)
*G06F 3/00* (2006.01)
*G06F 3/048* (2013.01)
*G06F 3/14* (2006.01)
*G01M 17/00* (2006.01)

(56) References Cited

U.S. PATENT DOCUMENTS

| | | | | |
|---|---|---|---|---|
| 2012/0231740 | A1* | 9/2012 | Bradley | 455/41.3 |
| 2013/0132848 | A1* | 5/2013 | Bhatt | 715/733 |
| 2014/0052872 | A1* | 2/2014 | Varoglu et al. | 709/231 |
| 2014/0120829 | A1* | 5/2014 | Bhamidipati et al. | 455/3.06 |
| 2014/0134947 | A1* | 5/2014 | Stouder-Studenmund | 455/41.2 |
| 2014/0215086 | A1* | 7/2014 | Pitschel et al. | 709/231 |
| 2014/0277937 | A1* | 9/2014 | Scholz et al. | 701/36 |
| 2014/0280552 | A1* | 9/2014 | Ng et al. | 709/204 |
| 2014/0366105 | A1* | 12/2014 | Bradley et al. | 726/5 |

FOREIGN PATENT DOCUMENTS

| | | |
|---|---|---|
| KR | 10-2012-0115827 A | 10/2012 |
| KR | 10-2013-0017269 | 2/2013 |
| KR | 10-2013-0028504 | 3/2013 |
| KR | 10-2013-0063659 | 6/2013 |
| KR | 10-2013-0066722 A | 6/2013 |

OTHER PUBLICATIONS

Office Action mailed Aug. 4, 2015, in corresponding Korean Application No. 10-2013-0162426.

* cited by examiner

SYSTEM AND METHOD FOR CONTROLLING A MIRROR LINK OF A MULTIMEDIA SYSTEM AND PORTABLE TERMINAL

CROSS-REFERENCE TO RELATED APPLICATION

This application claims the benefit of priority to Korean Patent Application No. 10-2013-0162426, filed on Dec. 24, 2013 in the Korean Intellectual Property Office, the disclosure of which is incorporated herein in its entirety by reference.

BACKGROUND

1. Field of the Invention

The present invention relates to a system and method of controlling a mirror link, and more particularly, to a method of controlling a mirror link that independently controls a configuration of an audio-video-navigation (AVN) system of a vehicle and a screen of a portable terminal which are mirror linked.

2. Description of the Related Art

As multimedia services such as a Digital television, an Internet Protocol Television (IPTV), a Video On Demand (VOD), or the like are diversified and a terminal technology is developed, a demand for user devices that can freely access and display multimedia contents such as digitized video, graphic, audio, etc., in particular, a portable terminal (e.g., a smart phone) is increased. Recently, with the increase of such demand, a technology of wirelessly sharing data between a plurality of user devices, and a display mirroring technology of wirelessly sharing a screen are integrated with the user device.

In recent years, as vehicles become more advanced, various vehicles having a variety of advanced options in the interior are being developed. Due to such options, vehicles are equipped with devices that can obtain a variety of information, such as a traffic condition, road information, a guide map necessary for driving to destination, and the which are frequently change while the vehicle is being driven. A typical example of such devices may include a device that enables an output of a television (TV), and an AVN system for a vehicle equipped with a navigation device that is an automatic driving guidance device. A monitor (e.g., display) is disposed in a front panel of the AVN, and a car audio system is installed within the front panel to allow a user of the vehicle to watch TV and a video as well as listen to music. In addition, recently, various applications available in the portable terminal (e.g., a smart phone) are able to be used through the AVN of the vehicle by connecting the portable terminal of the vehicle user (e.g., of a vehicle user's device) with the AVN of the vehicle.

SUMMARY

The present invention has been made in view of the above problems, and provides a system and a method of controlling a mirror link that independently operates and outputs an AVN and a screen of a portable terminal which are mirror linked according to a user selection.

In accordance with an aspect of the present invention, a method of controlling a mirror link may include: connecting a multimedia system mounted within a vehicle to a portable terminal; executing an application to perform the mirror link; outputting a menu to independently control an output image of the multimedia system and the portable terminal to the vehicle or a user of the portable terminal, after executing the application; and independently controlling the output image of the multimedia system and the portable terminal according to a user selection. The menu may include a selection item to output the application executed in the portable terminal in the AVN, and output a screen related to information regarding the vehicle in the portable terminal.

The method may further include transmitting the information of the vehicle to the portable terminal via the mirror linked connection by the vehicle, wherein the independently control of the output image includes operating the portable terminal to output a screen related to the information regarding the vehicle, and operating the AVN to output the application executed in the portable terminal. The information regarding the vehicle may be transmitted to the portable terminal using a SetParameter protocol defined in a real-time streaming protocol (RTSP). The method may further include converting the information regarding the vehicle into the SetParameter protocol. The information regarding the vehicle may be transmitted and stored in a remote server by the portable terminal.

BRIEF DESCRIPTION OF THE DRAWINGS

The objects, features and advantages of the present invention will be more apparent from the following detailed description in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
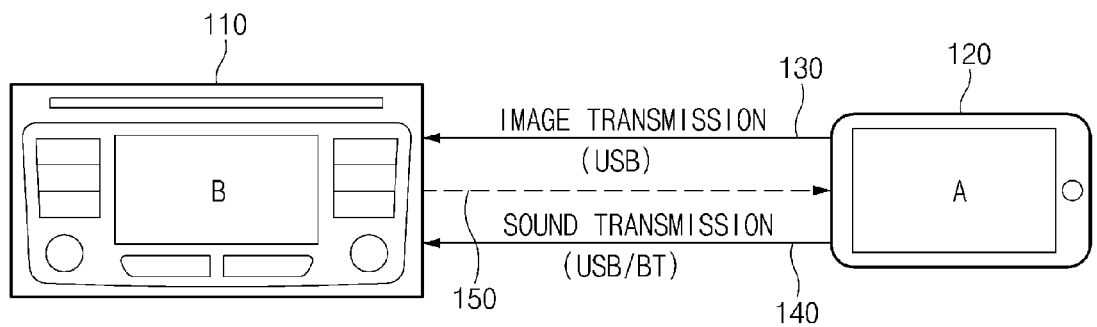
FIG. 1 is an exemplary diagram illustrating an AVN and a portable terminal which are mirror linked by a mirror link control method according to an exemplary embodiment of the present invention.

FIG. 1 is an exemplary diagram illustrating an AVN and a portable terminal which are mirror linked by a mirror link control method according to an exemplary embodiment of the present invention. Referring to FIG. 1, an AVN 110 disposed within a vehicle and a portable terminal (e.g., a smart phone) 120 may be connected by a mirror link. The mirror link may enable an output result executed and output from the portable terminal 120 to be output via the AVN of the vehicle. Thus, a user may use an application or a service executed in the portable terminal 120 through a screen B of the AVN 110 that is greater than a screen A of the portable terminal 120. Accordingly, the portable terminal 120 may be configured to transmit an image output to screen A to the AVN 110 via a USB connection as illustrated in reference numeral 130, and transmit a sound to the AVN 110 via the USB or a Bluetooth as illustrated in reference numeral 140.

As described above, the mirror link control method according to the present invention may be configured to output the same image on both screens A and B of both devices 110 and 120. Further, different images may be output on both screens A and B of both devices 110 and 120 according to a user selection. For example, the screen B of the AVN 110 may be configured to output the application executed in the portable terminal 120, and the screen A of the portable terminal 120 may be configured to output a screen related to vehicle information. Accordingly, in the mirror link control method according to the present invention, the vehicle information may be transmitted to the portable terminal 120 via the mirror linked AVN 110 as illustrated in reference numeral 150.

Figure 2:
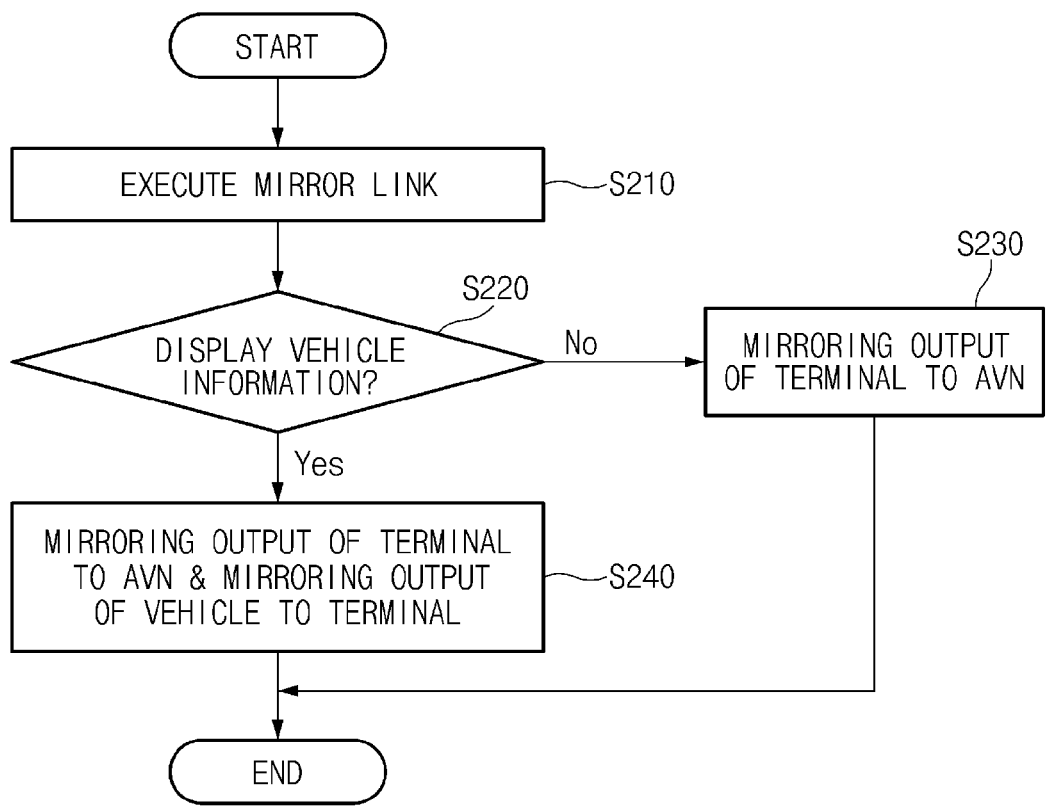
FIG. 2 is an exemplary flowchart illustrating a mirror link control method according to an exemplary embodiment of the present invention.

FIG. 2 is an exemplary flowchart illustrating a mirror link control method according to an exemplary embodiment of the present invention. Referring to FIG. 2, the mirror link control method may include steps S210 to S240. First, the mirror link may be executed (S210). In particular, a multimedia system (e.g., AVN) mounted within the vehicle and the portable terminal may be connected to each other via a wired/wireless electrical connection device (e.g., USB cable). Then, an application to perform a mirror link may be executed by a controller having a processor and a memory.

In particular, the application may be automatically executed while connecting to the electrical connection device, and the application may be installed on the portable terminal, but is not limited thereto, and may be also installed in the vehicle's multimedia system to be executed. Then, a menu that may include a selection item may be output by the controller to a user to select whether to independently operate an image output screen of the multimedia system and an image output screen of the portable terminal which are mirror linked. In particular, the screen of the multimedia system of the vehicle may be executed by the controller to output the application executed in the mirror linked portable terminal, and simultaneously, the screen of the portable terminal may be executed by the controller to output a selection item that may operate to output vehicle information related to the mirror linked vehicle (S220).

At step S220, when the display of the vehicle information is not selected (NO), both the screen of the multimedia system and the screen of the portable terminal may be executed by the controller to output the application executed in the same portable terminal in the same manner as a general mirror link (S230). Additionally, at step S220, when the display of the vehicle information is selected (YES), the screen of the multimedia system of the vehicle may be executed by the controller to output the application executed in the mirror linked portable terminal, and simultaneously, the screen of the portable terminal may be executed by the controller to output the vehicle information related to the mirror linked vehicle (S240).

Further, the mirror link control method according to an exemplary embodiment of the invention may further include transmitting, by the controller, various information of a corresponding vehicle to the portable terminal, in response to detecting a user selection of a selection item to select step S240 at step S220. In particular, the mirror link control method according to an exemplary embodiment of the invention may use real time streaming protocol (RTSP) used to transmit the image data of the portable terminal and the multimedia system, without generating a separate transmission control protocol (TCP) connection for the transmission of a corresponding information between the portable terminal and the multimedia system of the vehicle, to transmit the various information of vehicle to the portable terminal. In other words, when a protocol called SetParameter defined in a RTSP standard is used, the various information of vehicle may be transmitted to the portable terminal using the mirror link without requiring a separate TCP connection.

Due to the nature of the RTSP, once the image begins to be transmitted from the portable terminal to the multimedia system as a stream type in the mirror linked portable terminal and multimedia system (RTSP PLAY), the next step may be performed by the RTP to proceed streaming. In other words, the RTSP may be configured to enter an idle state until a TEARDOWN/PAUSE command is transmitted and received. In particular, various types of information regarding the vehicle may be transmitted to the portable terminal via the SetParameter protocol by utilizing the rest state. Eventually, when the image data related to the screen of the portable terminal is streamed to the multimedia system, the multimedia system may be configured to periodically transmit various types of information regarding the vehicle to the portable terminal using the RTSP protocol called SetParameter.

Accordingly, the mirror link control method according to an exemplary embodiment of the invention may further include converting, by the controller, the information of vehicle into the SetParameter protocol defined in the RTSP standard. Further, the mirror link control method may include transmitting, by the controller, various types of information regarding a corresponding vehicle transmitted to the portable terminal via the mirror link connection to a remote server (e.g., cloud) using a data communication function of the portable terminal and may also include storing, by the controller, the information. The stored data may be used in the process of monitoring the state of the vehicle being driven.

Thus, the mirror link control method according to an exemplary embodiment of the invention may include independently outputting, by a controller, the output screen of the mirror linked AVN and portable terminal based on a user selection, outputting the application executed in the mirror linked portable terminal on the screen mounted in the multimedia system of the vehicle, and simultaneously, outputting the vehicle information related to the mirror linked vehicle on the screen of the portable terminal. Further, simultaneously, the vehicle information output from the portable terminal may be output by a customized user designed user interface (UI). The method of controlling a mirror link of the present invention may include independently operating an AVN and a screen of a portable terminal which are mirror linked based on a user selection to output a particular image.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the accompanying claims.

What is claimed is:

1. A method of controlling a mirror link, the method comprising:
    connecting, by a controller, a multimedia system mounted within a vehicle to a portable terminal;
    executing, by the controller, an application to perform the mirror link;
    outputting, by the controller, a menu to independently control an output image of the multimedia system and the portable terminal to the vehicle; and
    independently controlling, by the controller, the output image of the multimedia system and the portable terminal based on a user selection, wherein
    different images are output on both screens of the multimedia system and the portable terminal based on the user selection, and
    the multimedia system transmits information of the vehicle to the portable terminal via the mirror link when the outputted image of the portable terminal is streamed to the multimedia system via the mirror link.

2. The method of claim 1, wherein the menu includes a selection item to output the application executed in the portable terminal in the AVN, and output a screen related to information of the vehicle in the portable terminal.

3. The method of claim 2, wherein the independently controlling of the output image includes:
    operating, by the controller, the portable terminal to output a screen related to the information of the vehicle; and
    operating, by the controller, the AVN to output the application executed in the portable terminal.

4. The method of claim 3, wherein the information of the vehicle is transmitted to the portable terminal using a SetParameter protocol defined in a real-time streaming protocol (RTSP).

5. The method of claim 4, further comprising:
    converting, by the controller, the information of the vehicle into the SetParameter protocol.

6. The method of claim 3, wherein the information of the vehicle is transmitted and stored in a remote server through the portable terminal.

7. A system of controlling a mirror link, the method comprising:
    a memory configured to store program instructions; and
    a processor configured to execute the program instructions, the program instructions when executed configured to:
        connect a multimedia system mounted within a vehicle to a portable terminal;
        execute an application to perform the mirror link;
        output a menu to independently control an output image of the multimedia system and the portable terminal to the vehicle; and
        independently control the output image of the multimedia system and the portable terminal based on a user selection, wherein
    different images are output on both screens of the multimedia system and the portable terminal based on the user selection, and
    the multimedia system transmits information of the vehicle to the portable terminal via the mirror link when the outputted image of the portable terminal is streamed to the multimedia system via the mirror link.

8. The system of claim 7, wherein the menu includes a selection item to output the application executed in the portable terminal in the AVN, and output a screen related to information of the vehicle in the portable terminal.

9. The system of claim 8, wherein the program instructions when executed are further configured to:
    operate the portable terminal to output a screen related to the information of the vehicle; and
    operate the AVN to output the application executed in the portable terminal.

10. The system of claim 9, wherein the information of the vehicle is transmitted to the portable terminal using a SetParameter protocol defined in a real-time streaming protocol (RTSP).

11. The system of claim 10, wherein the program instructions when executed are further configured to:
    convert the information of the vehicle into the SetParameter protocol.

12. The system of claim 9, wherein the information of the vehicle is transmitted and stored in a remote server through the portable terminal.

13. A non-transitory computer readable medium containing program instructions executed by a processor, the computer readable medium comprising:
    program instructions that connect a multimedia system mounted within a vehicle to a portable terminal;
    program instructions that execute an application to perform the mirror link;
    program instructions that output a menu to independently control an output image of the multimedia system and the portable terminal to the vehicle; and
    program instructions that independently control the output image of the multimedia system and the portable terminal based on a user selection, wherein
    different images are output on both screens of the multimedia system and the portable terminal based on the user selection, and
    the multimedia system transmits information of the vehicle to the portable terminal via the mirror link when the outputted image of the portable terminal is streamed to the multimedia system via the mirror link.

14. The non-transitory computer readable medium of claim 13, wherein the menu includes a selection item to output the application executed in the portable terminal in the AVN, and output a screen related to information of the vehicle in the portable terminal.

15. The non-transitory computer readable medium of claim 14, further comprising:

program instructions that operate the portable terminal to output a screen related to the information of the vehicle; and program instructions that operate the AVN to output the application executed in the portable terminal.

16. The non-transitory computer readable medium of claim 15, wherein the information of the vehicle is transmitted to the portable terminal using a SetParameter protocol defined in a real-time streaming protocol (RTSP).

17. The non-transitory computer readable medium of claim 16, further comprising:

program instructions that convert the information of the vehicle into the SetParameter protocol.

* * * * *